(12) United States Patent
Han et al.

(10) Patent No.: US 9,642,031 B2
(45) Date of Patent: May 2, 2017

(54) DATA OFFLOAD METHOD AND USER EQUIPMENT

(71) Applicant: Huawei Technologies Co., LTD, Shenzhen (CN)

(72) Inventors: Guanglin Han, Beijing (CN); Jian Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 154 days.

(21) Appl. No.: 14/159,186

(22) Filed: Jan. 20, 2014

(65) Prior Publication Data
US 2014/0133298 A1 May 15, 2014

Related U.S. Application Data

(63) Continuation of application No. PCT/CN2012/078956, filed on Jul. 20, 2012.

(30) Foreign Application Priority Data

Jul. 20, 2011 (CN) .......................... 2011 1 0203495

(51) Int. Cl.
*H04W 28/02* (2009.01)
*H04W 28/08* (2009.01)

(52) U.S. Cl.
CPC ... *H04W 28/0231* (2013.01); *H04W 28/0289* (2013.01); *H04W 28/08* (2013.01)

(58) Field of Classification Search
CPC .............................................. H04W 28/0231
See application file for complete search history.

(56) References Cited

U.S. PATENT DOCUMENTS

| 2006/0193295 | A1 | 8/2006 | White et al. | |
| 2009/0116447 | A1* | 5/2009 | Balasubramanian . | H04W 36/14 370/331 |
| 2011/0235546 | A1* | 9/2011 | Horn ....................... | H04L 12/66 370/254 |
| 2011/0287794 | A1* | 11/2011 | Koskela et al. ............... | 455/509 |
| 2011/0305220 | A1* | 12/2011 | Lindoff et al. ................ | 370/331 |
| 2012/0023189 | A1* | 1/2012 | Giaretta et al. ............... | 709/217 |

(Continued)

FOREIGN PATENT DOCUMENTS

| CN | 101047942 A | 10/2007 |
| CN | 101984713 A | 3/2011 |

(Continued)

OTHER PUBLICATIONS

Stewart, R., et al., "Stream Control Transmission Protocol," Network Working Group Request for Comments: 2960, May 16, 2001, 119 pages.

(Continued)

*Primary Examiner* — Jason Mattis
(74) *Attorney, Agent, or Firm* — Slater Matsil, LLP

(57) ABSTRACT

Embodiments of the present invention provide a data offload method and a user equipment. The data offload method includes receiving offload configuration signaling sent by a base station. The offload configuration signaling indicates to perform wireless network offload configuration. Offload configuration is performed according to the offload configuration signaling and data is offloaded according to the offload configuration.

17 Claims, 4 Drawing Sheets

(56) References Cited

U.S. PATENT DOCUMENTS

| | | | |
|---|---|---|---|
| 2012/0230191 A1* | 9/2012 | Fang | H04W 36/22 |
| | | | 370/235 |
| 2014/0043979 A1* | 2/2014 | Etemad et al. | 370/237 |
| 2014/0066054 A1* | 3/2014 | Jung | H04W 36/14 |
| | | | 455/426.1 |

FOREIGN PATENT DOCUMENTS

| | | |
|---|---|---|
| CN | 101990247 A | 3/2011 |
| CN | 102098798 A | 6/2011 |
| CN | 102833813 A | 12/2012 |
| EP | 2720508 A1 | 4/2014 |
| WO | 2010080966 A1 | 7/2010 |

OTHER PUBLICATIONS

International Search Report and Written Opinion received in Application No. PCT/CN2012/078956 mailed Nov. 1, 2012, 11 pages.

\* cited by examiner

DATA OFFLOAD METHOD AND USER EQUIPMENT

This application is a continuation of International Application No. PCT/CN2012/078956, filed on Jul. 20, 2012, which claims priority to Chinese Patent Application No. 201110203495.4, filed on Jul. 20, 2011, both of which are hereby incorporated by reference in their entireties.

TECHNICAL FIELD

Embodiments of the present invention relate to the communications field and, in specific embodiments, to a method for performing data offload in a wireless communications network and a user equipment for implementing data offload.

BACKGROUND

LTE (long term evolution), also popularly called 3.9G, has a 100 Mbps data download capability, and is considered as a mainstream technology for evolution from 3G to 4G. LTE study includes some parts that are universally considered to be very important, for example, waiting time shortening, a higher user data rate, system capacity and coverage improvement, and operating expense reduction.

An LTE project of a 3GPP (3rd generation partnership project) is the largest new technology research and development project started by the 3GPP in recent two years. This technology with OFDM/FDMA (orthogonal frequency division multiplexing/frequency division multiple access) as a core may be considered as a "quasi-4G" technology. Major performance objectives of the 3GPP LTE project include: to provide a peak rate of downlink 100 Mbps and uplink 50 Mbps under a 20 MHz spectrum bandwidth; to improve the performance of a cell edge user; to increase a cell capacity; to reduce a system delay, so that the unidirectional transmission delay inside a user plane is less than 5 ms, and the duration of migration of a control plane from a sleep state to an activated state is less than 50 ms, and the duration of migration from a resident state to the activated state is less than 100 ms; to support the cell coverage with a radius of 100 km; to provide an access service greater than 100 kbps for a user moving at a high speed of 350 km/h; to support paired or unpaired spectrums, and flexibly configure multiple bandwidths from 1.25 MHz to 20 MHz.

WLAN (wireless local area networks) is a system that performs data transmission using a radio frequency (RF) technology. This technology is a supplement of a wired local area network, and achieves the objective of network extension, enabling the wireless local area network to make use of a simple access architecture to allow a user to achieve an unobstructed network with no network cable or distance limit through it. As a standard of the WLAN, WiFi (wireless fidelity) is a wireless network formed by an AP (Access Point) and a wireless network interface card. The AP, generally called a network bridge or an access point, serves as a bridge between a traditional wired local area network and a wireless local area network. Therefore, any user terminal equipped with a wireless network interface card may share resources of a wired local area network and even a wide area network through an AP. Its working principle is equal to a HUB or a route imbedded with a radio transmitter, while the wireless network interface card is a client device responsible for receiving signals transmitted by the AP.

Currently, for an EPS (evolved packet system), an air interface adopts an LTE technology, which is implemented by deploying an eNodeB (evolved Node B or evolved base station). However, when a UE (user equipment) uses a service in the EPS system, the user equipment may implement transmission only through the LTE air interface of the eNodeB deployed on a network.

With the increase of bandwidth demands, a network operator needs to increase the transmission bandwidth over the air interface by deploying more LTE base stations and narrowing the coverage, which causes increase of investment costs and maintenance costs. Therefore, to satisfy increasing mobile bandwidth demands and make up for the regret of insufficient transmission bandwidth over the LTE air interface, offload the data that needs to be transmitted over the LTE air interface to other available access technologies needs to be taken into consideration.

SUMMARY OF THE INVENTION

Embodiments of the present invention provide a method for performing data offload in a wireless communications network and a user equipment for implementing data offload, capable of supporting LTE load offload.

In an aspect, an embodiment of the present invention provides a data offload method. Offload configuration signaling sent by a base station indicates offload configuration. Offload configuration is performed according to the offload configuration signaling and data is offload according to the offload configuration.

In another aspect, an embodiment of the present invention provides a data offload method. Offload configuration signaling, which indicates to perform wireless network offload configuration, is generated and sent a user equipment.

In still another aspect, an embodiment of the present invention provides a user equipment. A offload control unit is configured to receive offload configuration signaling sent by a base station. The offload configuration signaling indicates to perform wireless network offload configuration. The offload configuration is performed according to the offload configuration signaling. An adapted layer unit is configured to offload data according to the offload configuration.

In the embodiments of the present invention, data transmitted over an LTE air interface may be offload to other available access technologies, thereby satisfying increasing mobile bandwidth demands and making up for the regret of insufficient transmission bandwidth over the LTE air interface.

BRIEF DESCRIPTION OF THE DRAWINGS

To illustrate the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art according to the embodiments of the present invention without creative efforts shall fall within the protection scope of the present invention.

With the rapid development of intelligent user equipments, increasingly more mobile communications terminals are integrated with communications modules of wireless local area networks, for example, WiFi modules. In another aspect, with people's increasing demands on mobile bandwidth, existing wireless cellular communications systems bear increasingly higher pressure of data traffic. A feasible method is to integrate a wireless cellular technology with a radio access technology, for example, to use a WLAN to offload the data traffic of the mobile cellular communications system, thereby greatly improving the experience of a cellular system user.

Figure 1:
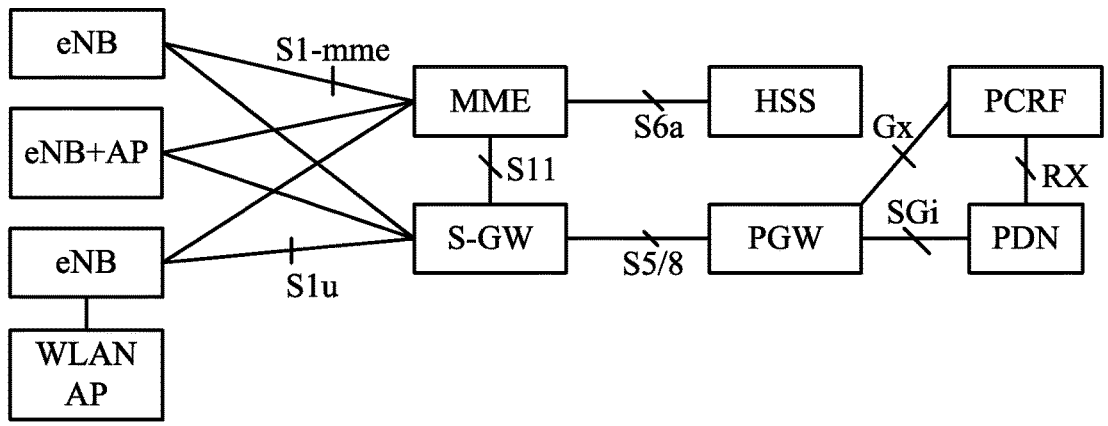
FIG. 1 is a schematic diagram of a WLAN offload control plane network architecture capable of applying an embodiment of the present invention.

FIG. 1 is a schematic diagram of a WLAN offload control plane network architecture capable of applying an embodiment of the present invention. An MME (mobility management entity), an S-GW (serving gateway), a PGW (packet data network gateway), a PCRF (policy charging and rules function), an HSS (home subscriber server), a PDN (packet data network are shown in FIG. 1. These elements may be network elements of an LTE core network EPC (evolved packet core) that is defined by an existing 3GPP protocol system.

The MME is connected to the S-GW through an S11 interface, and the S-GW is connected to the PGW through an S5/8 interface. The PGW is connected to the PDN through an SGi interface and connected to the PCRF through a Gx interface at the same time. The MME is also connected to the HSS through an Sha interface. In the radio access network of the LTE, there is only one network element, that is, an eNodeB. The eNB is connected to the MME and the S-GW through a control plane interface S1-mme and a user plane interface S1u, respectively.

In the aforementioned network architecture, the base station eNodeB and a wireless local area network access point WLAN AP for offload may be located at the same node or different nodes on a physical device.

Figure 2:
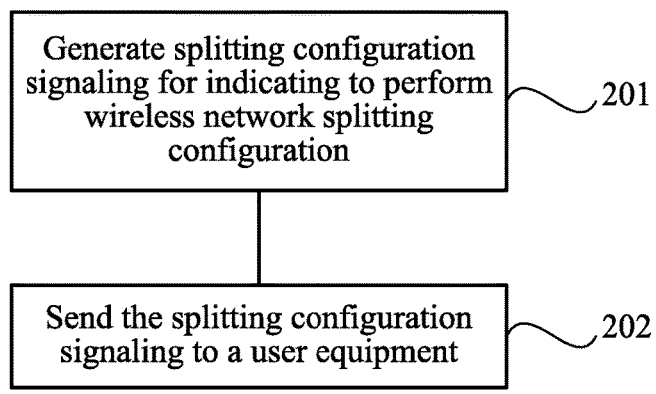
FIG. 2 is a flowchart of a base station-side data offload method according to an embodiment of the present invention.

Referring to FIG. 2, a control plane process of base station-side data offload according to an embodiment of the present invention is illustrated. FIG. 2 is a flowchart of a method for base station-side data offload according to an embodiment of the present invention.

201: A base station generates offload configuration signaling which indicates to perform wireless network offload configuration.

Before generating the offload configuration signaling, the base station may receive offload request signaling sent by a user equipment, or before receiving the offload request signaling sent by the user equipment, the base station may perform function negotiation with the user equipment.

The function negotiation between the base station and the user equipment may include setting up a long term evolution LTE air interface connection with the user equipment; or receiving offload capability information sent by the user equipment during or after LTE connection setup, where the offload capability information is used to indicate a offload support capability of the user equipment.

Before configuring offload signaling for the user equipment, the base station enodeB needs to learn whether the currently accessed user equipment supports LTE load offload, and send, according to information that the currently serving user equipment supports LTE load offload, the offload configuration signaling to the user equipment.

Before bearing a service through the LTE air interface, the user equipment first sends an LTE air interface connection setup request (RRC Connection Setup Request) message to the base station. When receiving the LTE air interface connection setup request message of the user equipment, the base station sends an LTE air interface connection setup (RRC Connection Setup) message to the user equipment. After successfully setting up the LTE air interface connection, the user equipment sends an LTE air interface connection setup complete (RRC Connection Setup Complete) message to the base station. At this time, the base station sets up the LTE air interface connection with the user equipment.

Optionally, during an RRC connection setup process, the user equipment reports, to the base station, the capability of whether it supports other radio access technologies for offload LTE load, that is, information about the supported capability for offload the LTE load is included in the RRC connection setup request message. After the completion of the RRC connection setup, the user equipment may also report the information about the supported capability for offload the LTE load to the base station by sending a capability reporting message that carries the offload capability information of the user equipment to the base station. After receiving the offload capability information, the base station learns whether the currently accessed user equipment may support the LTE load offload. That is to say, during or after the LTE connection setup, the base station receives the offload capability information sent by the user equipment, where the offload capability information is used to indicate the offload support capability of the user equipment.

Additionally, the base station may also learn, through system configuration, whether the currently accessed user equipment may support the LTE load offload, and a terminal does not need to send the offload capability information. The offload capability information includes: whether to support wireless network offload, and a supported or unsupported radio access technology, for example, whether to support WLAN offload, WiFi offload and/or offload of other radio access technologies.

Through the process, the base station may obtain the information such as whether the currently accessed user equipment may support the LTE load offload, and/or the radio access technology for offload supported by the user equipment, and executes subsequent offload configuration management according to the information. For example, if the user equipment does not support the radio access offload, the base station configures that the user equipment does not use an LTE load offload function in the subsequent configuration; if the user equipment supports the WLAN offload, then in the subsequent configuration, the user equipment may receive the WLAN offload configuration sent by the base station; if the user equipment also supports the WiFi offload, then in the subsequent configuration, the user equipment may receive the WiFi offload configuration sent by the base station; if the user equipment also supports offload of other radio technologies offload, the base station sends the offload configuration of other radio technologies to the user equipment in the subsequent configuration.

The following takes the WLAN as an example to describe operations about how the base station sends the offload configuration signaling to the user equipment when the WLAN is found or lost. The following operations are also applicable to offload LTE load using other radio access technologies.

Generally, when finding an available WLAN AP or a WLAN AP with better signal quality, the user equipment may send the offload request signaling to the base station, and performs data offload according to the received offload configuration signaling sent by the base station. The available WLAN AP indicates that the signal quality of the WLAN AP detected by the user equipment exceeds a pre-configured threshold, and the WLAN AP with better signal quality indicates that the signal quality of the WLAN AP is better than the currently serving WLAN AP and exceeds the pre-configured threshold. The offload request signaling may include a WLAN AP notification message and/or a WLAN signal quality message. The offload configuration signaling includes offload allowing configuration. The offload allowing configuration includes one or more pieces of the following content: an identifier of a service access point allowing offload (for example, an identifier of a logical channel allowing offload); an identifier of a network service node for offload data (for example, an identifier of a WLAN AP for offload data); and an identifier of a service data stream allowing offload (for example, a source Internet protocol IP address, and/or a target IP address, and/or a port number of a service data stream allowing offload).

Specifically, when detecting an available WLAN AP nearby or finding a WLAN AP with better signal quality, the user equipment sends the offload request signaling (for example, a WLAN AP notification message) to the base station. The WLAN AP notification message may include one or more available WLAN AP identifiers and WLAN AP signal strength indications detected by the user equipment, where the WLAN AP identifier may be obtained through a WLAN AP radio message.

When receiving the WLAN AP notification message, the base station obtains the WLAN AP capable of serving the user equipment. If the message includes multiple candidate WLAN APs, the base station may select, for the user equipment, one AP for offload, for example, select a WLAN AP with best signal quality or a WLAN AP with lightest load.

Additionally, the base station may also obtain, according to its own configuration and/or network topology information, the WLAN AP capable of serving the user equipment; if there are multiple WLAN APs capable of serving the user equipment, for example, the multiple WLAN APs cover an area where the user equipment is located at the same time, the base station may select at least one WLAN AP for the user equipment from the multiple WLAN APs; during selection, the base station needs to consider at least one of the following factors, that is, WLAN AP signal quality or WLAN AP load status. Specifically, the base station determines a WLAN AP with best signal quality or a WLAN AP with lightest load.

After determining the WLAN AP serving the user equipment, the base station sends the offload configuration signaling to the user equipment, and configures the user equipment to use the WLAN to offload the data that needs to be transmitted over the LTE air interface.

Optionally, after completing the offload configuration, the user equipment sends a offload configuration complete message to the base station.

Additionally, when the signal quality of the WLAN AP used by the user equipment becomes poorer and exceeds a pre-configured threshold, or transmission fails for multiple times and the number of times exceeds the preset maximum number of retransmission times, the user equipment sends the offload request signaling (for example, WLAN signal quality information) to the base station. The WLAN signal quality information may include the identifier of a WLAN AP whose signal becomes poorer and/or the signal strength indication of a WLAN AP whose signal becomes poorer. Additionally, the WLAN signal quality message may also include the identifier of an adjacent serving WLAN AP and a WLAN AP signal strength indication detected by the user equipment.

When the base station receives the WLAN signal quality message, if the base station determines that the WLAN AP serving the user equipment needs to be replaced or the offload of the user equipment at the currently serving WLAN AP needs to be stopped, the base station may send the offload configuration signaling to the user equipment, so as to re-configure the offload configuration of the user equipment. At this time, the offload configuration signaling includes a offload forbidding configuration message, where the offload forbidding configuration message includes one or more pieces of the following content: an identifier of a service access point requiring offload forbidding (for example, an identifier of a logical channel requiring offload forbidding); an identifier of a network service node for forbidding offload data (for example, an identifier of a WLAN AP for forbidding offload data), and an identifier of a service data stream requiring offload forbidding (for example, a source IP address, and/or a target IP address, and/or a port number of a service data stream requiring offload forbidding). In addition, the offload configuration signaling further includes offload allowing configuration, which indicates the user equipment to use another available WLAN AP or WLAN AP with better signal quality for offload.

Optionally, after completing the offload configuration, the user equipment sends the offload configuration complete message to the base station.

To sum up, before generating the offload configuration signaling which indicates to perform the wireless network offload configuration, the base station receives the offload request signaling sent by the user equipment. The offload request signaling includes the wireless local area network access point WLAN AP notification message and/or the wireless local area network WLAN signal quality message. The WLAN AP notification message includes the detected WLAN AP identifier and/or WLAN AP signal strength indication, and the WLAN signal quality message includes the identifier of a WLAN AP whose signal becomes poorer and/or the signal strength indication of a WLAN AP whose signal becomes poorer. Optionally, before receiving the offload request signaling sent by the user equipment, the base station receives the WLAN AP signal detected by the user equipment.

202: The base station sends the offload configuration signaling to the user equipment.

In the foregoing various cases, the base station generates the offload configuration signaling which indicates to perform the wireless network offload configuration, and sends the offload configuration signaling to the user equipment. The user equipment receives the offload configuration signaling sent by the base station, which indicates to perform the wireless network offload configuration, and performs the offload configuration according to the offload configuration signaling.

Figure 3:
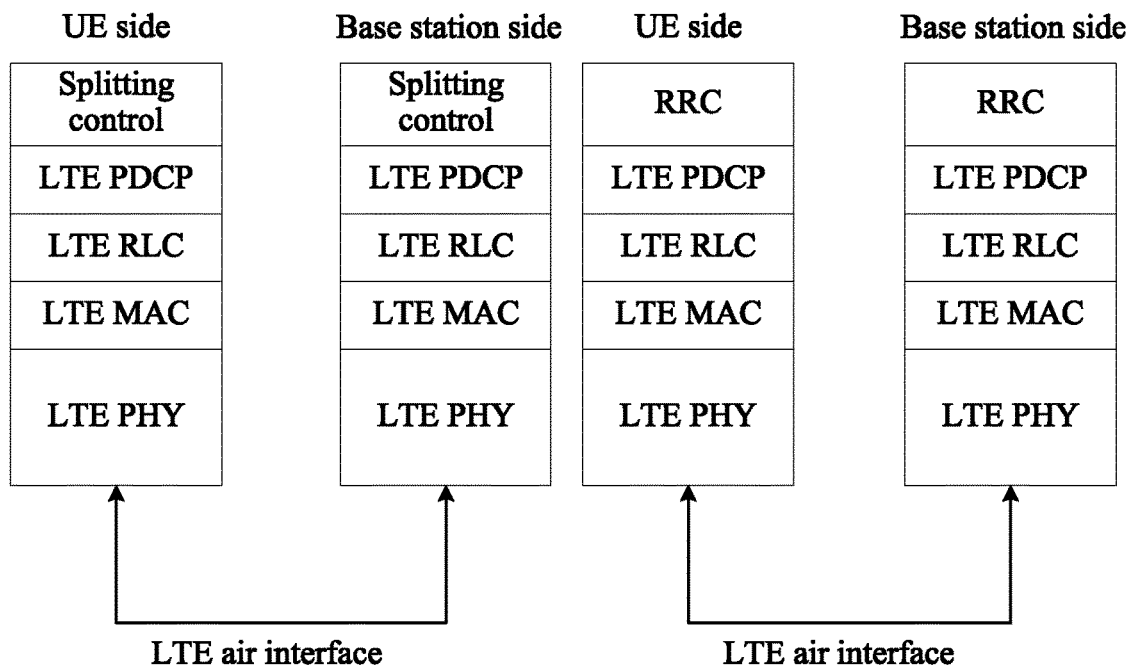
FIG. 3 is a schematic diagram of a control plane protocol stack related to an embodiment of the present invention.

FIG. 3 is a schematic diagram of a control plane protocol stack related to an embodiment of the present invention. As shown in FIG. 3, the control plane protocol may be defined as a new offload control protocol layer; or may reuse an LTE RRC protocol stack, that is, a control plane message is an RRC message and is implemented by modifying an RRC protocol.

In the data offload method of the embodiment of the present invention, data transmitted over an LTE air interface may be offload to other available access technologies, thereby satisfying increasing mobile bandwidth demands and making up for the regret of insufficient transmission bandwidth over the LTE air interface.

In the following, referring to FIG. 4 and FIG. 5, a user equipment side is taken as an example to specifically describe a process of implementing a data offload method in a wireless communications network according to an embodiment of the present invention.

Figure 4:
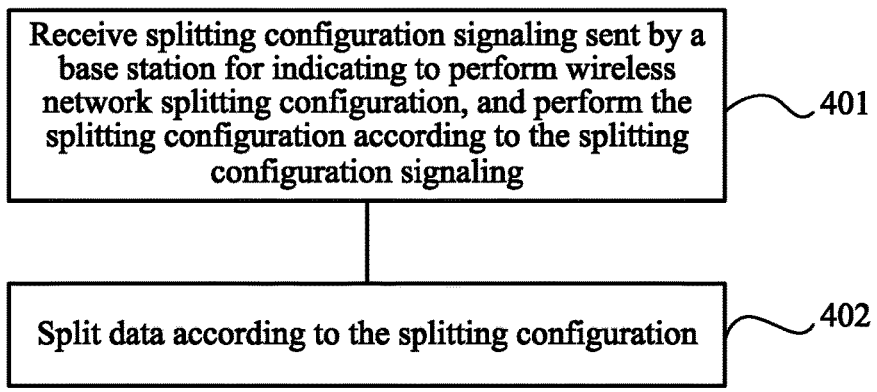
FIG. 4 is a flowchart of a base station-side data offload method according to an embodiment of the present invention.

FIG. 4 is a flowchart of a method for base station-side data offload according to an embodiment of the present invention.

To implement data offload, an AL layer (adapted layer) unit is implemented under an RLC or a PDCP protocol layer, for obtaining uplink data and delivering the uplink data to a WLAN air interface at the bottom layer for sending; or for receiving an adapted layer protocol data unit AL PDU and delivering the AL PDU to an SAP (service access point).

401: A user equipment receives offload configuration signaling sent by a base station, which indicates to perform wireless network offload configuration, and performs the offload configuration according to the offload configuration signaling.

The offload configuration signaling includes offload allowing configuration and offload forbidding configuration. The offload allowing configuration may include one or more pieces of the following content: an identifier of a service access point allowing offload (for example, an identifier of a logical channel allowing offload); an identifier of a network service node for offload data (for example, an identifier of a WLAN AP for offload data); and an identifier of a service data stream allowing offload (for example, a source Internet protocol IP address, and/or a target IP address, and/or a port number of a service data stream allowing offload). A offload stopping configuration message includes one or more pieces of the following content: an identifier of a service access point requiring offload forbidding (for example, an identifier of a logical channel requiring offload forbidding); an identifier of a network service node for forbidding offload data (for example, an identifier of a WLAN AP for forbidding offload data), and an identifier of a service data stream requiring offload forbidding (for example, a source IP address, and/or a target IP address, and/or a port number of a service data stream requiring offload forbidding).

The user equipment configures an adapted layer entity or a protocol layer according to the offload configuration signaling.

402: Offload data according to the offload configuration.

After receiving the offload configuration from an upper layer, the AL layer entity performs offload sending (for example, uplink) and receiving (for example, downlink) on the data according to the offload configuration.

When the user equipment serves as a transmit end, an application layer generates the uplink data that needs to be sent, where the data is cached in a PDCP and/or an RLC entity or a protocol layer. If the offload configuration signaling indicates to execute data offload, the AL layer entity obtains the upper layer data according to the offload configuration indicated in the configuration signaling, for example, obtains, according to an identifier of a service access point for offload in the configuration information, uplink data of the corresponding service access point (for example, obtains, according to an identifier of a logical channel in the configuration information, uplink data of the corresponding logical channel); or obtains, according to an identifier of a service data stream for offload in the configuration information, uplink data of the corresponding service data stream (for example, obtains, according to an IP address, a port number, and so on of a service data stream for offload in the configuration information, uplink data of the corresponding service data stream).

Additionally, the offload configuration signaling may also include one or more of the following data sending priorities: a service access point priority; and a service data stream priority. In the AL layer entity, a logical channel prioritization (Logical Channel Prioritization, LCP) module may be implemented. If the base station configures, for the user equipment, the priority for obtaining the data, the logical channel prioritization module obtains the cached data at the upper layer according to the information about the configured priority for sending data.

To sum up, the user equipment obtains the data that needs to be sent; assembles the data, which needs to be sent, into the AL PDU, and sends the AL PDU to a corresponding service access point, where the AL PDU carries an AL PDU feature. The AL PDU feature includes a service access point identifier, a service data stream identifier, a user equipment identifier, and an Internet protocol IP address or port number. Optionally, the data that needs to be sent is obtained according to the data sending priority from the offload configuration signaling, where the data sending priority includes the service access point priority and/or the service data stream priority. Optionally, the assembling the data into the AL PDU includes multiplexing and assembling the data into the AL PDU.

Additionally, the AL entity or protocol layer may multiplex or perform tandem connection on the obtained uplink data from multiple service access points (for example, the logical channel and the dedicated transmission channel) and service data streams into one adapted layer protocol data unit AL PDU, where the AL PDU, for example, includes multiplexed data of a logical channel group and a logical channel identifier to which the corresponding data belongs.

That is to say, the uplink data is multiplexed and assembled, by the multiplexing module in the AL layer unit, into the AL PDU carrying the AL PDU feature, and the AL PDU is sent to the corresponding service access point, where the AL PDU feature may include the logical channel identifier, a data amount of the corresponding channel, the user equipment identifier, and the IP address or port number. The AL PDU feature may also include uplink data of the logical channel obtained by the logical channel prioritization (Logical Channel Prioritization) module in the AL layer entity according to the priority of the logical channel. Here, one AL PDU may correspond to one or more logical channels.

Figure 5:
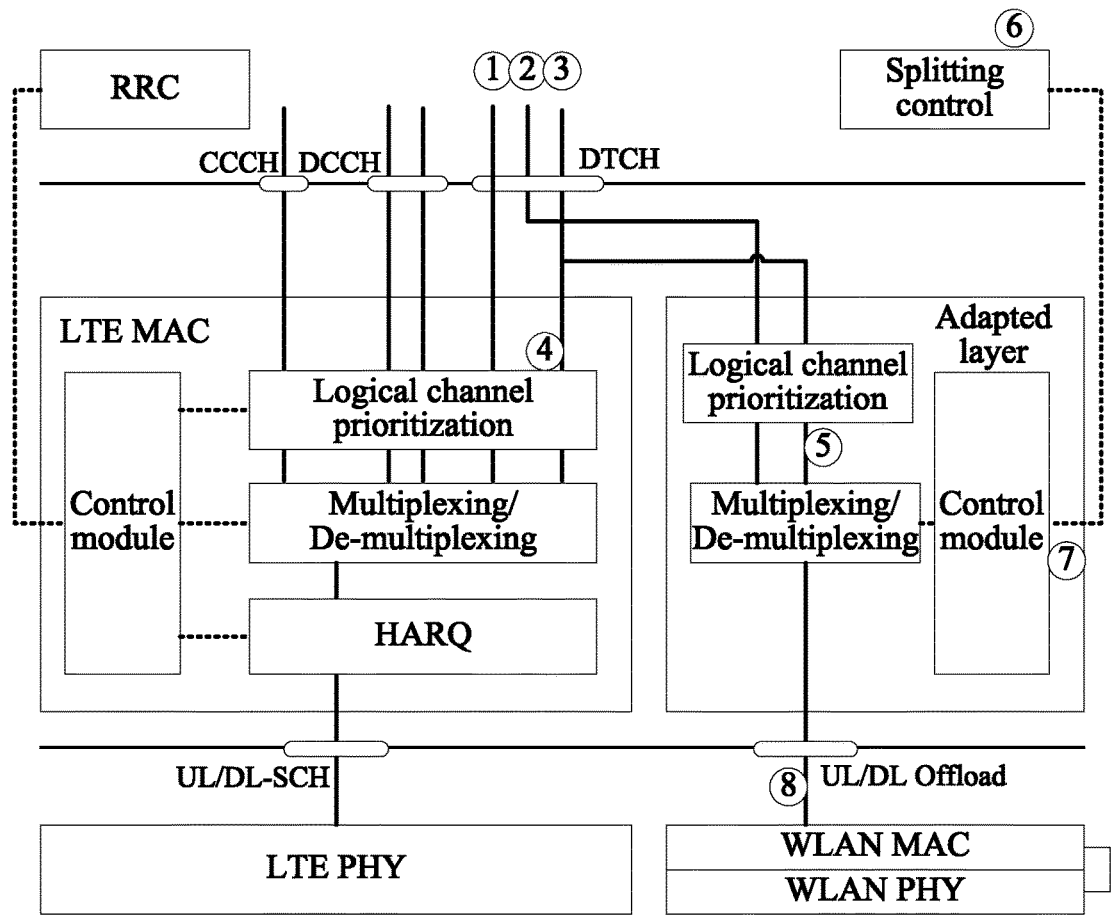
FIG. 5 is a structural diagram of an adapted layer for implementing a data offload method according to an embodiment of the present invention.

FIG. 5 is a structural diagram of an adapted layer for implementing a data offload method according to an embodiment of the present invention. As shown in FIG. 5, an RLC or PDCP layer entity receives data from an upper layer, and the data is delivered to a protocol layer at the bottom layer through a service access point between an RLC or a PDCP layer and a lower layer (AL layer). A solution recorded in the embodiment may be applicable to any logical channel (for example, CCCH, DCCH, and DTCH), and the dedicated transmission channel (DTCH) is taken as an example here.

Corresponding to a logical channel 1, the logical channel is not configured as a logical channel of WLAN offload. Therefore, data of the logical channel needs to be transmitted through LTE. When obtaining an uplink resource allocated by a base station, an LTE MAC layer obtains the data of the logical channel 1 through the service access point, delivers the data to the bottom layer through a transmission channel service access point, and transmits the data over an LTE air interface.

Corresponding to a logical channel 2, the logical channel is configured as a logical channel of WLAN offload. Therefore, data of the logical channel needs to be transmitted through a WLAN, and the AL layer obtains the data of the logical channel 2 through the service access point between the RLC or PDCP and the AL layer, delivers the data to the bottom layer through a UL/DL offload SAP (UL/DL offload service access point) between the AL layer and the bottom layer, and transmits the data over a WLAN air interface.

Corresponding to a logical channel 3, the logical channel is configured that data of the logical channel may be transmitted through the LTE or the WLAN. LTE MAC and the AL layer obtain the data of the RLC or PDCP layer through the service access point between the LTE MAC and the AL layer and the RLC or PDCP layer, and the data obtained by the LTE MAC is delivered to the bottom layer through the service access point between the LTE MAC and an LTE PHY, and is transmitted over the LTE air interface; and the data obtained by the AL layer is transmitted to the bottom layer through the UL/DL offload SAP (UL/DL offload service access point) between the AL layer and the bottom layer, and is transmitted over the WLAN air interface.

When the user equipment serves as a receive end, the AL entity or protocol layer of the user equipment receives an AL PDU carrying an AL PDU feature. If an AL multiplexing function is implemented at a transmit end, an de-multiplexing module in an AL layer unit of the receive end de-multiplexes the AL PDU, and transmits, according to a service access point identifier and/or a logical channel identifier included in a data packet, the de-multiplexed downlink data to a corresponding AL upper layer service access point and/or logical channel, respectively.

The AL PDU feature includes a service access point identifier (or a logical channel identifier), a user equipment identifier, a service data stream identifier, and an IP address or a port number. A radio access technology for the offload may bear other services when offload LTE load. Therefore, to ensure that the received bottom layer offload access entity may deliver LTE offload data to the AL entity, optionally, before the AL PDU is received, the received AL PDU is identified by a data packet filtering unit according to the AL PDU feature, and the identified AL PDU is sent to an adapted layer unit.

In the AL layer unit, a control module may be implemented for receiving configuration of an offload control unit and controlling the multiplexing module, the de-multiplexing module, and the logical channel prioritization module.

To sum up, the user equipment receives the AL PDU carrying the AL PDU feature, de-multiplexes the AL PDU, and transmits the de-multiplexed data to the corresponding service access point. Optionally, before the AL PDU is received, the received AL PDU is identified according to the AL PDU feature, and the identified AL PDU is sent to the adapted layer entity/protocol layer in the user equipment.

The data offload method implemented at a user side is described in detail in combination with FIG. 4 and FIG. 5. It should be understood that, the data offload method is also applicable to a base station side, where the corresponding units and modules are correspondingly adjusted.

In the data offload method of the embodiment of the present invention, data transmitted over an LTE air interface may be offload to other available access technologies, thereby satisfying increasing mobile bandwidth demands and making up for the regret of insufficient transmission bandwidth over the LTE air interface.

Figure 6:
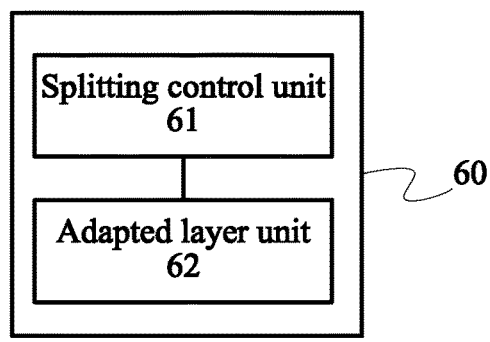
FIG. 6 is a schematic block diagram of a user equipment with a data offload capability according to an embodiment of the present invention.
Figure 7:
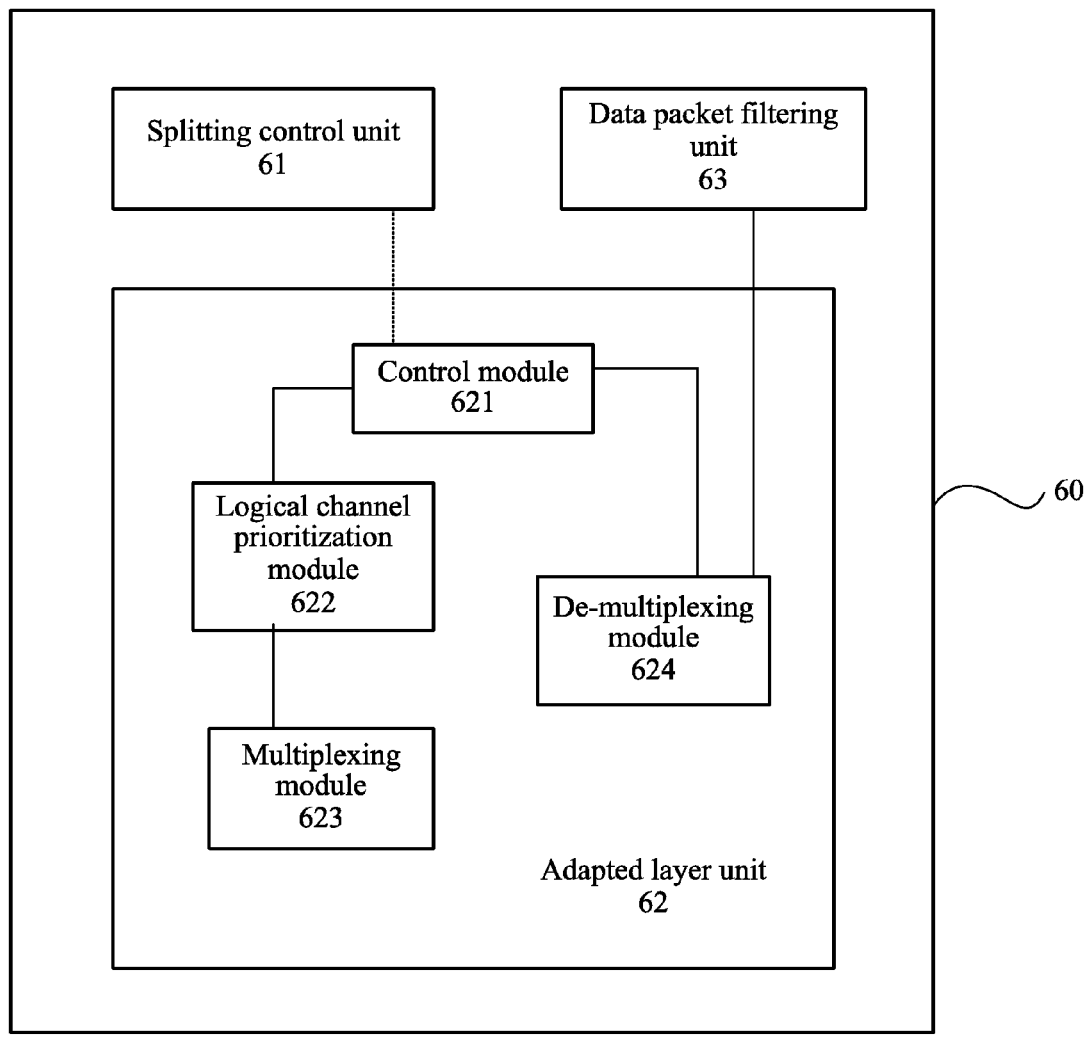
FIG. 7 is a schematic block diagram of a user equipment with a data offload capability according to another embodiment of the present invention.

FIG. 6 is a schematic block diagram of a user equipment with a data offload capability according to an embodiment of the present invention. FIG. 7 is a schematic block diagram of a user equipment with a data offload capability according to another embodiment of the present invention. The user equipment 60 includes: a offload control unit 61, configured to receive offload configuration signaling sent by a base station, which indicates to perform wireless network offload configuration, and perform the offload configuration according to the offload configuration signaling; and an adapted layer unit 62, configured to offload data according to the offload configuration.

The adapted layer unit 62 includes a control module 621, configured to control the AL layer unit to obtain offload data or offload the data, for example, whether to obtain data of a specific logical channel, or offload to which specific logical channels the offload data needs to be transmitted. The control module may receive configuration from the offload control unit, where the offload control unit may be an independent offload control protocol layer, or may be implemented at an LTE RRC layer or NAS layer (non-access stratum layer).

At an AL layer, for the WLAN offload data transmitted by more than one logical channel, a multiplexing function may be implemented at the AL layer. That is to say, data of multiple logical channels from an upper layer is assembled into one AL PDU, the AL PDU carries a multiplexed identifier of a logical channel and/or a data amount of the corresponding logical channel, and the assembled AL PDU is transmitted, through a service access point between the AL layer and a lower layer, to a bottom layer for sending.

It can be seen that, optionally, the adapted layer unit 62 further includes a logical channel prioritization LCP module 622 and a multiplexing module 623, where the LCP module 622, under the control of the control module 621, obtains the data according to a data sending priority from the offload configuration signaling, where the data sending priority includes a service access point priority and/or a service data stream priority. The multiplexing module 623, under the control of the control module 621, multiplexes and assembles the obtained data into an adapted layer protocol data unit AL PDU, and sends the AL PDU to the corresponding service access point.

The AL PDU needs to be processed by the AL layer at a receive end, and at the same time, the user equipment may also possibly use a WLAN application independent of an EPS, for example, data of the application is not transmitted through an EPS core network. Therefore, the AL PDU needs to be identified at a receive end and delivered to a UL/DL offload SAP. A data packet filtering unit may be implemented at the receive end to filter out the data of the AL layer according to an AL PDU feature and submit the data to the AL layer for processing, where the AL PDU feature may also be a user equipment identifier, an IP address, a port number, and so on.

If an AL at a transmit end has implemented the function of multiplexing the data of multiple logical channels into one AL PDU, the AL at the receive end needs to implement a de-multiplexing function, for delivering the data of multiple logical channels multiplexed at the transmit end, through the service access point between the AL and the upper layer, to the corresponding logical channel.

Therefore, when the user equipment serves as the receive end, the adapted layer unit includes a de-multiplexing module 624, where the de-multiplexing module 624, under the control of the control module 621, de-multiplexes the received AL PDU and sends the de-multiplexed data to the corresponding service access point. To differentiate the AL PDU assembled at the AL of the transmit end, optionally, a data packet filtering unit 63 may be set in the user equipment, where the data packet filtering unit 63 is configured to identify, according to the AL PDU feature, the received AL PDU, and send the identified AL PDU to the adapted layer unit 62. The AL PDU feature includes a service access point identifier, a service data stream identifier, a user equipment identifier, and an Internet protocol IP address or a port number.

With the user equipment in the embodiment of the present invention, data transmitted over an LTE air interface may be offload to other available access technologies, thereby satisfying increasing mobile bandwidth demands and making up for the regret of insufficient transmission bandwidth over the LTE air interface.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of a method or algorithm described in combination with the embodiments disclosed herein may be embodied directly in hardware, in a software module executed by a processor, or in a combination of the two. The software module may be located in a random access memory (RAM), a memory, a read only memory (ROM), an electrically programmable ROM, an electrically erasable programmable ROM, a register, a hard disk, a removable disk, a CD-ROM, or any other storage media well-known in the art.

Although some embodiments of the present invention have been shown and described, a person of skill in the art should understand that various modifications can be made to the embodiments without going beyond the idea and principles of the present invention, and the modifications should fall within the protection scope of the present invention.

What is claimed is:

1. A data offload method, comprising:
   detecting, by a user equipment (UE), one or more available wireless local area network (WLAN) access points (APs);
   sending offload request signaling in response to one or more first WLAN APs of the available WLAN APs having respective signal strengths at the UE that exceed a predetermined threshold and having respective signal strengths at the UE that exceed a signal strength of a WLAN AP serving the UE, the offload request signaling including one or more WLAN AP notifications each including an identifier of a respective one of the first WLAN APs and an indicator of the signal strength of the respective one of the first WLAN APs;
   receiving offload configuration signaling sent by a base station, the offload configuration signaling providing an indication to perform wireless network offload configuration for offload to a second WLAN AP selected from the first WLAN APs by the base station according to at least one of a signal quality of the first WLAN APs and load of the first WLAN APs and further according to at least one of a base station configuration and network topology information, and performing the offload configuration according to the offload configuration signaling; and
   offloading data according to the offload configuration;
   wherein the offload configuration signaling includes an offload allowing configuration including a first identifier of the second WLAN AP indicating at least one target for offloading data to, the first identifier including at least one of an identifier of a service access point allowing offload, an identifier of a network service node for offloading data, and an identifier of a service data stream allowing offload.

2. The method according to claim 1, wherein offloading the data according to the offload configuration comprises:
   receiving an adapted layer protocol data unit (AL PDU), wherein the AL PDU carries an AL PDU feature;
   de-multiplexing the AL PDU; and
   transmitting the de-multiplexed data to a corresponding service access point.

3. The method according to claim 2, wherein offloading the data further comprises, in response to receiving the AL PDU, identifying the received AL PDU according to the AL PDU feature and sending the identified AL PDU to an adapted layer unit;
   wherein the adapted layer unit is implemented under one of an RLC or a PDCP protocol layer.

4. The method according to claim 2, wherein the AL PDU feature comprises the first identifier, and wherein the identifier includes the identifier of a service access point allowing offload, the identifier of the service data stream allowing offload a user equipment identifier, and at least one of an Internet protocol address or a port number.

5. The method according to claim 1, wherein offloading the data according to the offload configuration comprises:
   obtaining data that needs to be sent;
   assembling the data into an AL PDU; and
   sending the AL PDU to a corresponding service access point, wherein the AL PDU carries an AL PDU feature.

6. The method according to claim 5, wherein obtaining the data that needs to be sent comprises obtaining the data according to a data sending priority from the offload configuration signaling, wherein the data sending priority comprises a service access point priority and/or a service data stream priority.

7. The method according to claim 5, wherein assembling the data into the AL PDU comprises multiplexing and assembling the data into the AL PDU.

8. A data offload method, comprising:
receiving offload request signaling sent from a user equipment (UE) in response to one or more first wireless local area network (WLAN) access points (APs) of available WLAN APs detected by the UE having respective signal strengths at the UE that exceed a predetermined threshold and having respective signal strengths at the UE that exceed a signal strength of a WLAN AP serving the UE, the offload request signaling including one or more WLAN AP notifications each including an identifier of a respective one of the first WLAN APs and an indicator of the signal strength of the respective one of the first WLAN APs;
receiving offload configuration signaling sent by a base station, offload configuration signaling providing an indication to perform wireless network offload configuration for offload to a second WLAN AP selected from the first WLAN APs by the base station according to at least one of a signal quality of the first WLAN APs and load of the first WLAN APs and further according to at least one of a base station configuration and network topology information, and performing the offload configuration according to the offload configuration signaling;
generating offload configuration signaling which indicates to perform wireless network offload configuration to a second WLAN AP selected from the first WLAN APs according to at least one of a signal quality of the first WLAN APs and load of the first WLAN APs and further according to at least one of a base station configuration and network topology information; and
sending the offload configuration signaling to a user equipment and causing the user equipment to perform the offload configuration according to the offload configuration signaling;
wherein the offload configuration signaling includes an offload allowing configuration including a first identifier of the second WLAN AP indicating at least one target for offloading data to, the first identifier including at least one of an identifier of a service access point allowing offload, an identifier of a network service node for offloading data, and an identifier of a service data stream allowing offload.

9. The method according to claim 8, wherein the offload configuration signaling further includes offload forbidding configuration;
wherein the offload forbidding configuration comprises one or more of:
an identifier of a service access point requiring offload forbidding;
an identifier of a network service node for forbidding offload data; and
an identifier of a service data stream requiring offload forbidding.

10. The method according to claim 8, wherein, before generating offload configuration signaling, the method further comprises setting up a long term evolution LTE air interface connection with the user equipment or receiving offload capability information sent by the user equipment during or after LTE connection setup, wherein the offload capability information is used to indicate a offload support capability of the user equipment.

11. The method according to claim 10, wherein the offload capability information comprises information indicating whether to support wireless network offload, and a supported or unsupported radio access technology.

12. A user equipment, comprising:
a processor; and
a non-transitory computer-readable storage medium storing a program to be executed by the processor, the program including instructions to:
detect, by the user equipment, one or more available wireless local area network (WLAN) access points (APs);
send offload request signaling in response to one or more first WLAN APs of the available WLAN APs having respective signal strengths at the UE that exceed a predetermined threshold and having respective signal strengths at the user equipment that exceed a signal strength of a WLAN AP serving the user equipment, the offload request signaling including one or more WLAN AP notifications each including an identifier of a respective one of the first WLAN APs and an indicator of the signal strength of the respective one of the first WLAN APs;
receive offload configuration signaling sent by a base station, the offload configuration signaling including an indication to perform wireless network offload configuration for offload to a second WLAN AP selected from the first WLAN APs by the base station according to at least one of a signal quality of the first WLAN APs and load of the first WLAN APs and further according to at least one of a base station configuration and network topology information, and perform the offload configuration according to the offload configuration signaling; and
offload data according to the offload configuration;
wherein the offload configuration signaling includes an offload allowing configuration including an identifier of the second WLAN AP indicating at least one target for offloading data to, the identifier including at least one of an identifier of a service access point allowing offload, an identifier of a network service node for offloading data, and an identifier of a service data stream allowing offload.

13. The user equipment according to claim 12, wherein the instructions to offload data are implemented under one of an RLC or a PDCP protocol layer and control obtaining the data or offloading the data.

14. The user equipment according to claim 13, wherein the instructions to offload data further include instructions to obtain the data according to a data sending priority from the offload configuration signaling, wherein the data sending priority comprises a service access point priority and/or a service data stream priority.

15. The user equipment according to claim 13, wherein the instructions to offload data further include instructions to:
multiplex and assemble the obtained data into an adapted layer protocol data unit (AL PDU), and to send the AL PDU to a corresponding service access point; and
de-multiplex the received AL PDU and send the de-multiplexed data to the corresponding service access point, wherein the AL PDU carries an AL PDU feature.

16. The user equipment according to claim 15, wherein the AL PDU feature comprises the identifier of the second WLAN AP, and wherein the identifier includes the identifier of a service access point allowing offload, the identifier of the service data stream allowing offload, a user equipment identifier, and at least one of an Internet protocol IP address or a port number.

17. The user equipment according to claim 15, wherein the instructions to offload data include instructions to identify the received AL PDU according to the AL PDU feature and to send the identified AL PDU to the adapted layer unit.

* * * * *